July 16, 1963  H. A. SCHMITT  3,097,551
PORTABLE HYDRAULIC TORQUE WRENCH
Filed April 21, 1961  2 Sheets-Sheet 1

INVENTOR.
HUBERT A. SCHMITT
BY Reynolds & Christensen
ATTORNEYS

July 16, 1963 H. A. SCHMITT 3,097,551
PORTABLE HYDRAULIC TORQUE WRENCH
Filed April 21, 1961 2 Sheets-Sheet 2
Fig. 3.
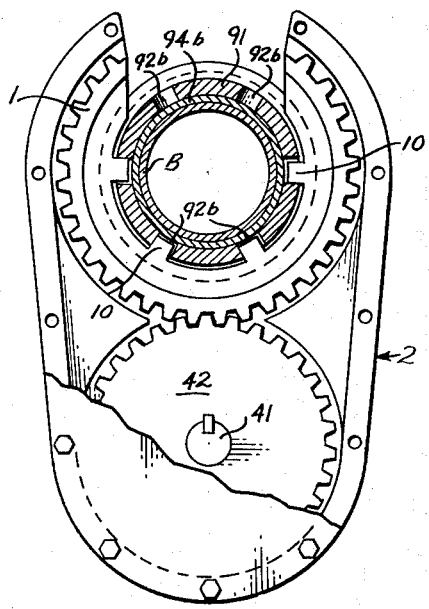
Fig. 4.
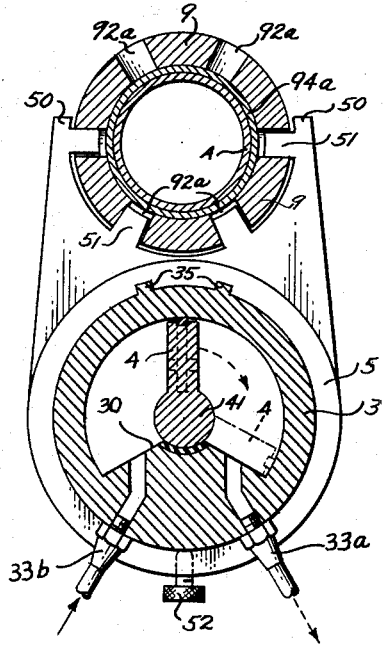
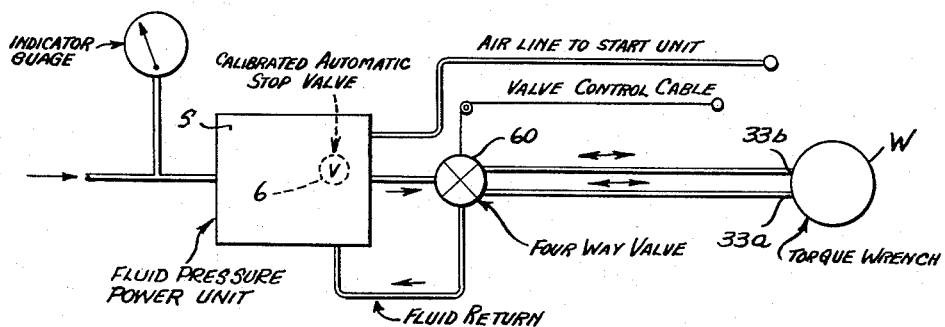
Fig. 5.
INVENTOR.
HUBERT A. SCHMITT
BY
Reynolds & Christensen
ATTORNEYS

United States Patent Office 3,097,551
Patented July 16, 1963

3,097,551
PORTABLE HYDRAULIC TORQUE WRENCH
Hubert A. Schmitt, Box 1423, Rte. 3, Auburn, Wash.
Filed Apr. 21, 1961, Ser. No. 104,637
5 Claims. (Cl. 81—56)

Various shop operations, such as the tightening of threadedly interconnected coupling elements between pipe or tube ends, require that the torque applied be quite exact. Too little torque permits leakage, and too much torque is likely to damage the coupling, or the tube. Such couplings, or speaking generally, such fittings, are frequently required to be torqued in regions where fixed-type torque wrenches can not be used, and in consequence the required minimum torque is difficult to obtain with exactitude. Moreover, space is often so restricted in regions of limited access that there is not room to apply a standard lever-type torque wrench.

It is the object of this invention to provide a portable torque wrench capable of being used in such regions of limited access, as well as in more readily accessible locations, which will produce a torque of predetermined value, no more and no less. Furthermore, it is an object to provide such a torque wrench which will have the capability indicated, and which can be operated from a controllable source of pressure fluid supply, preferably hydraulic, such as is readily available in shops where such a torque wrench is likely to be used, and one which can be adjusted as to pressure applicable, and thereby it is capable of varying the total torque exerted on the fitting, as may be required in different fittings.

Lever-type torque wrenches of types heretofore used induce certain forces which act on the couplings, and hence on the tube ends being connected, in opposite directions normal to the common axis of the tube ends; thereby there is a tendency to produce torque about a transverse axis, and so to displace the tubes relatively, and to misalign them. Insofar as such forces are involved, the forces applicable to the couplings are not true torque about the common axis of the couplings, but are turning moments about some such transverse axis, productive of relative displacement of the tube ends to the extent permitted by the elastomeric seal interposed between the latter, and by the rigidity of the coupling elements. It is an object of this invention to produce, to the highest degree possible, true torque alone, about the axis of the tube ends, and to eliminate displacing or distorting forces, or torque about any transverse axis.

Moreover, torque wrenches which employ lever arms of any appreciable length necessarily use arms which are stoutly built, for strength, hence are heavy, and productive of a certain inertia when moved in the operations of torquing a coupling. They are moved at speeds which will vary under varying circumstances. Their inertia being variable, thereby becomes a factor in producing torque, but there is no way of determining this inertia factor. It thus becomes a source of inaccuracy in torquing to a predetermined value. It is an object of this invention to eliminate this source of inaccuracy, by using a very short torque arm, of constant weight and of substantially unvarying inertia under all conditions of use, whereby the torque applied can be accurately measured as the product of the applied and known hydraulic pressure on a constant area over a known small torque arm.

It is also an object to provide a torque wrench of this general nature which will be of simple and relatively inexpensive construction, light in weight and therefore readily portable, and when moved to a different location requiring only a connection to a source of pressure fluid.

Furthermore, it is an object to provide such a torque wrench which, by reason of the fact that it is powered by a hydraulic pressure fluid source, is wholly safe if used within or in the neighborhood of fuel tanks or the like, where electrical power is prohibited and pneumatic power is dangerous to workmen. Thus it is another object to provide a torque wrench of the nature indicated in which the fluid pressure source is of a nature that it does not create hazardous conditions in the vicinity of the work.

With such objects in mind, and others as will appear more fully hereinafter, the invention comprises the novel torque wrench shown in a representative form in the accompanying drawings, and as will be more fully explained hereinafter, and the novel features whereof are defined in the accompanying claims.

FIGURE 3 is in part a section and in part an end elevation, the viewpoint being indicated by the line 3—3 of FIGURE 2.

FIGURE 4 is a transverse vertical sectional view through the torque wrench, taken substantially at the line 4—4 of FIGURE 2.

FIGURE 5 is a diagrammatic showing of the torque wrench and the pressure fluid supply and control mechanism for the same.

Figure 1:
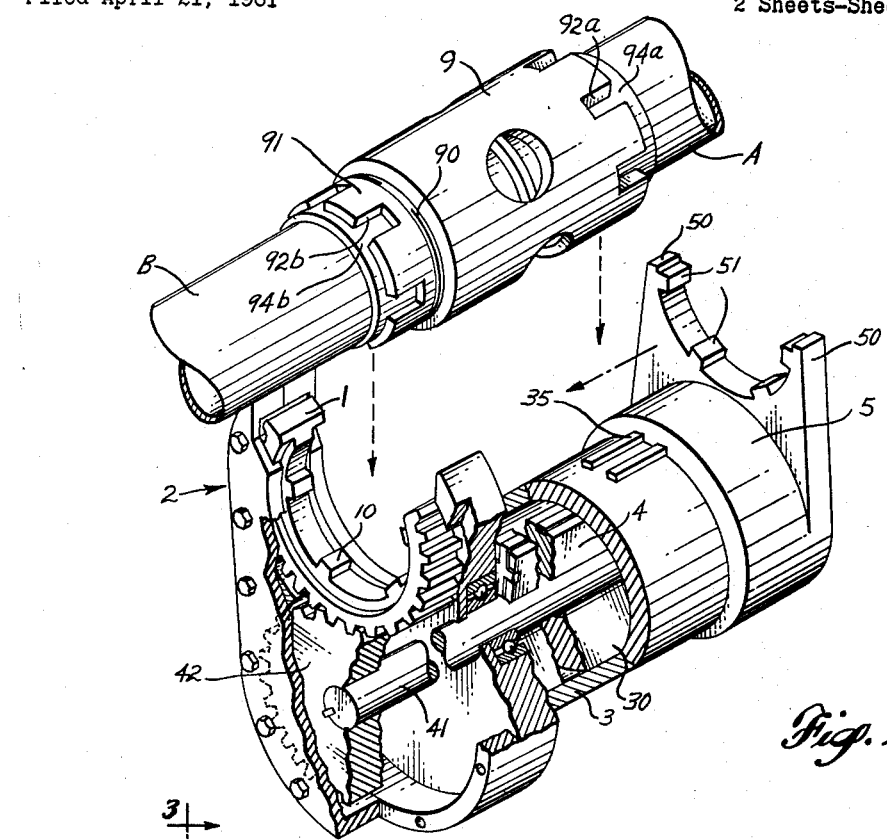
FIGURE 1 is an isometric view, partially in section, showing the torque wrench and a coupling to be torqued thereby in position for interengagement with the elements of the torque wrench.
Figure 2:
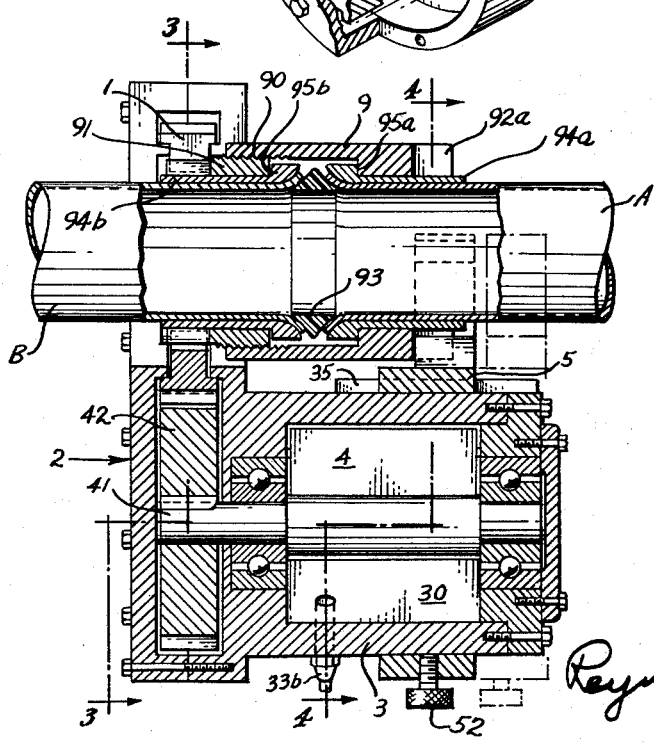
FIGURE 2 is an axial sectional view vertically through the torque wrench, but showing the coupling engaged by the elements of the torque wrench, and ready for torquing.

The use of the torque wrench is shown in conjunction with a fitting of a particular type, such as is used to join the ends of two tube sections A and B. The coupling of the type referred to includes a sleeve-like nut 9 threadedly engaged at 90 with a collar or sleeve 91. Each of the elements 9 and 91 is castellated at the end which is distant from the other castellated end, to leave end opening recesses 92a in the nut, and 92b in the collar. The ends of the tubes A and B which adjoin one another are flared, as best seen in FIGURE 2, and an elastomeric sealing ring 93 is interposed between the flared ends. Further sleeves 94a and 94b fit closely about the ends of the respective pipes A and B and engage the flared ends thereof, and each is formed with shoulders 95a or 95b, respectively facing oppositely, each of which is engageable by a complemental shoulder at the inner ends of the nut 9 and collar 91, respectively. By threading the nut 9 at 90 onto the collar 91 to a predetermined torque, the integrity of the coupling is assured. This is only one of various fittings that may be thus torqued, and is shown for purposes of illustration only.

The torque wrench of this invention includes two elements which are relatively rotatable about their axis which, in use, coincides with the common axis of the tubes, and which are engageable respectively with the nut 9 and the collar 91, for the purpose of effecting relative rotation thereof about their common axis, and which when so engaged are subjected to a force that produces a torque of quite exact, predetermined value. One of the members which is so engageable is in the form of a ring gear 1 which is interrupted to leave a gap sufficiently wide to permit entrance of the pipe B, for example, which it is to straddle, and to be moved endwise into engagement with the collar 91. The ring gear 1 is supported in a gear housing 2 for rotation. Its engagement with the collar 91 is effected by means of lugs 10 formed at the interior of the ring gear 1, of a size and spacing to engage by relative axial movement within the notches 92b formed at the castellated end of the collar 91.

The gear housing 2 is fixedly supported upon one end of a cylinder 3. Within the cylinder, and sealed with respect to it, is a movable motive element 4. The relationship might be a reciprocable one, but preferably, for reasons of compactness and ready determination of the torque arm to be employed, the motive element 4 is in the form of a vane of slight radial extent which is angularly movable within the cylinder 3 in relation to a fixed abutment 30 directed longitudinally of the cylinder. Whether the relationship is rotative or reciprocable, the motor is operatively connected to the ring gear 1. In the rotative construction illustrated, the vane is sealed with respect to the cylinder, and is mounted upon a shaft 41 which projects exteriorly of the cylinder into the gear housing 2, and there it mounts an intermediate or driver gear 42 which is in constant mesh with the interrupted ring gear 1.

Engagement is effected between the nut element 9 of the coupling and the non-rotative cylinder 3 by means such as a slide ring 5 mounted upon the cylinder for movement in the axial direction relative to the cylinder, and for axial movement only, this slide ring 5 having jaws 50 to straddle the element 9 and which project into alignment with the ring gear 1, and which are formed with lugs 51 which engage within the notches 92a of the castellated nut element 9 of the coupling, by relative axial movement. Such axial movement of the slide ring and its jaws 50 is permitted by means of the splined connection illustrated at 35 between the exterior of the cylinder and the slide ring. It is immaterial whether nut element 9 is engaged by jaws 50 and sleeve 91 by ring gear 1, or the reverse; ordinarily either type of engagement can be effected.

In use the coupling is tightened by hand to an appropriate extent, and then the tubes A and B are entered, the one within the jaws 50, and the other through the gap in the interrupted ring gear 1. The slide ring may then move axially toward the gear housing 2, until the lugs 10 engage within the notches 92b and the lugs 51 engage within the notches 92a. Now parts may be secured in this position, if desired, by the set screw 52 (see FIGURE 2) carried by the slide ring 5 and engageable with the cylinder 3. The cylinder is provided with two fittings 33a and 33b, for connection at any given time, one to a pressure fluid source of a predetermined value, say to a hydraulic source at 3000 p.s.i., and the other to a vent or low pressure region. For torquing the pressure is admitted to the interior of the cylinder between one side of the abutment 30 and the vane 4, and for untorquing or releasing the pressure is admitted to the other side of the abutment. Although the pressure at the source may be high, the area over which it is applied may be small, and the effective torque arm is low; the wrench is small. A typical wrench weighs eight pounds.

In FIGURE 5 the torque wrench is shown diagrammatically at W and the respective pressure fluid connections at 33a and 33b. Through a four-way valve 60 either connection 33a or 33b can be connected to a source of pressure fluid represented at S, and through a calibrated automatic stop valve 6 which can be set to be operated by pressure and to close when pressure in the torque wrench reaches a predetermined value. Thus when the pressure is admitted to the interior of the cylinder 3, the vane 4, having a known area subjected to the pressure, and a known or predetermined torque arm, is caused to move angularly within the cylinder until the pressure reaches the predetermined value, whereupon the pressure supply is automatically cut off. The angular movement of the vane 4, acting through the operative connection comprising, in the form shown, the shaft 41, the driver gear 42, and the ring gear 1, has rotated the coupling element 91 with respect to the coupling element 9, which in this instance has been held stationary by its engagement with the jaws 50. The result is that the coupling is torqued precisely to a predetermined value, for example, sixty-five foot-pounds, which is the product of the known small torque arm of the vane 4, and the known pressure admitted past the valve 6, and acting upon the known area of vane 4. This insures against over-torquing or under-torquing.

The control system diagrammatically shown in FIGURE 5, except as it affords a settable means to supply a pressure of predetermined but variable value, is not in itself a part of this invention but merely an indication of a convenient source of predetermined pressure available in most shops that would use such torque wrenches, capable of being connected to the torque wrench W at any of various locations, merely by means of connections at 33a and 33b, and capable of presetting the effective pressure to a desired value. The hydraulic fluid pressure supply is superior in most instances to an electrical source of power which, like pneumatic pressure, is unsatisfactory for use inside fuel tanks, for example.

Since the vane 4, in the rotative form shown, is connected through gear 42 directly with the ring gear 1, which rotates about the common axis of the tubes A and B, and the reacting element 50 is likewise coaxial with the tubes, pure torque about the axis of the tubes, alone, is produced. There is no displacing or distorting torque about a transverse axis, since there are no long lever arms. The same would be true if a reciprocative element were to replace the rotative vane 4. Also, the vane 4 is of small size and has a minimum torque arm, and is rotated by a predetermined pressure and not by hand, hence no appreciable inertia effect is produced, to disturb the accuracy of the torquing force.

The vane may be as long axially or of as great radius as may be found necessary to develop the proper torque. Normally it would be of slight radial extent and so might require higher pressures to product the necessary torquing force. Being small, it is readily held in the hand, is light, and is readily transportable. Such a torque wrench has been found to produce accurate values in the range from 26 to 65 foot-pounds, although these figures are given only as illustrative.

If it is necessary to untorque a coupling or fitting this can be done merely by applying the torque wrench in the manner already indicated, and admitting pressure to the opposite side of the vane 4.

The ring gear 1 will rotate in the process of torquing or untorquing past the point where its gap is in registry with the opening between the jaws of the gear housing 2 that journal it; some 250° of total rotation is possible in this design. Nevertheless, about 90° of power rotation, after preliminary tightening by hand, has been found sufficient. Disengagement of the torque wrench is simply effected merely by sliding the slide ring 5 in the axial direction away from the gear housing 2, whereupon the lugs 10 may be disengaged from the notches 92b, and the ring gear may be turned back by hand or by reverse application of pressure into a position of registry, whereupon the wrench is simply removed from the pipe or coupling element which it straddles.

I claim as my invention:

1. A torque wrench for use with a source of pressure fluid at a predetermined pressure, to apply a predetermined torque to two complemental and screw-threadedly connected elements of a fitting or the like, which wrench comprises an interrupted ring gear formed as a first jaw member of a size to straddle one of the two threadedly connected elements of the fitting, and including means to engage the same against relative rotational movement during rotation of one jaw relative to a second jaw, a cooperating second jaw member of a size capable of straddling the other of the two threadedly connected elements of the fitting, and including means to engage the same against relative rotational movement during rotation of one jaw member relative to the other, a fluid pressure rotary motor including a fixed and a movable member, and means interconnecting the two such members to the respective jaws, the connection between one jaw and the corresponding motor member including a torque arm of given length, through which relative rotation of the jaws may be effected, and means for connecting said motor to the pressure source of predetermined value, whereby to apply torque between the two jaws of a value which is the product of the pressure at the source times the length of the torque arm.

2. A torque wrench for use with a source of pressure fluid at a predetermined pressure, to apply a predetermined torque between two complemental elements of a fitting or the like which are screw-threadedly interconnected, which wrench comprises a cylinder, a rotary motive member movable therein under pressure, an interrupted ring gear supported upon said cylinder, offset therefrom, and formed as a first jaw of a size to straddle one of the two complemental elements, said jaw having locking means for interengagement with such straddled element against relative rotational movement during rotation of the first jaw relative to a second, a slide ring guided upon said cylinder for relative axial movement, means on said cylinder and said slide ring restricting any relative rotation therebetween, a second jaw carried by said slide ring, in alignment with the first jaw, of a size to straddle the other of the cooperating elements, and having locking means for interengagement with its element by movement of the slide ring in the axial direction, against relative rotational movement of the second jaw and its engaged element during rotation of the ring gear and its jaw relative to the slide ring and its jaw, means including a torque arm of given length connecting the motive member and the ring gear, and means for connecting the cylinder with the fluid pressure source, to apply torque between the two jaws of a value which is the product of the pressure at the source times the given torque arm.

3. A torque wrench as in claim 2, wherein the cylinder is formed with a longitudinally directed fixed abutment, and the motive member comprises a vane sealed within and angularly movable about the axis of said cylinder under the influence of pressure fluid admitted between the vane and the abutment, said vane also constituting the torque arm.

4. A torque wrench as in claim 2, including axially directed and interengaged splines carried by the exterior of the cylinder and by the slide ring, respectively, to prevent relative rotation between the second jaw and the cylinder, while enabling interengagement between said second jaw and its coupling element.

5. A torque wrench for use with a source of pressure fluid at a predetermined pressure, to apply a predetermined torque between two complemental elements of a pipe coupling or the like which are screw-threadedly interconnected, and each of which is castellated at its end distant from the other element, which wrench comprises a cylinder having a longitudinally directed abutment, a vane journaled in said cylinder for movement angularly about the cylinder's axis under the influence of a pressure fluid admitted between said vane and said abutment, an end plate closing one end of said cylinder, and formed as a gear housing offset at one side of the cylinder, having an entrance for admission of a coupling element, an interrupted ring gear journaled in said gear housing for rotation to effect registry between the interruption of the ring gear and the entrance of the gear housing, or to rotate the same from registry, lugs on the interior of said ring gear for engagement with the castellated end of a first coupling element by their relative axial movement, an intermediate gear, means connecting said intermediate gear to and for rotation by the vane, said intermediate gear meshing with said ring gear, a slide ring carried by the cylinder at its end opposite the ring gear, and formed with jaws aligned with the entrance to the gear housing, to straddle the second coupling element, and with lugs at the interior of said jaws for engagement with the castellated end of the second coupling element by movement relative thereto in the axial direction, interengaged splines upon the slide ring and upon the exterior of the cylinder, arranged for their relative axial movement only, and means carried by the cylinder for connecting the space between the abutment and the vane, at either side of the abutment, with the pressure fluid source.

References Cited in the file of this patent

UNITED STATES PATENTS

| 717,528 | Bartlett | Jan. 6, 1903 |
| 1,150,178 | Diefendorf | Aug. 17, 1915 |
| 1,634,602 | Wilson | July 5, 1927 |
| 1,861,728 | Vance et al. | June 7, 1932 |
| 1,948,028 | Edwards | Feb. 20, 1934 |
| 2,150,611 | Speck | Mar. 14, 1939 |
| 2,578,279 | Bardwell | Dec. 11, 1951 |